(12) United States Patent
Fauria Torrent et al.

(10) Patent No.: US 10,689,731 B2
(45) Date of Patent: Jun. 23, 2020

(54) DEVICE FOR DEGASSING LIGHT ALLOY MELTS BY MEANS OF ULTRASOUNDS AND SYSTEM

(71) Applicant: ULTRASION S.L., Cerdanyola del Vallès (ES)

(72) Inventors: Antoli Fauria Torrent, Sant Hilari Sacalm (ES); Manel Da Silva Lopez, Dosrius (ES); Francisco Javier Plantà Torralba, El Masnou (ES)

(73) Assignee: ULTRASION S.L., Cerdanyola del Vallès (ES)

( * ) Notice: Subject to any disclaimer, the term of this patent is extended or adjusted under 35 U.S.C. 154(b) by 220 days.

(21) Appl. No.: 15/540,417

(22) PCT Filed: Dec. 30, 2015

(86) PCT No.: PCT/ES2015/000185
§ 371 (c)(1),
(2) Date: Jun. 28, 2017

(87) PCT Pub. No.: WO2016/107941
PCT Pub. Date: Jul. 7, 2016

(65) Prior Publication Data
US 2018/0265946 A1    Sep. 20, 2018

(30) Foreign Application Priority Data
Dec. 30, 2014    (ES) .................................. 201500009

(51) Int. Cl.
*C22B 9/02*    (2006.01)
*F27D 27/00*    (2010.01)

(52) U.S. Cl.
CPC ................ *C22B 9/026* (2013.01); *C22B 9/02* (2013.01); *F27D 27/00* (2013.01); *Y02P 10/234* (2015.11)

(58) Field of Classification Search
CPC ............ C22B 9/02; C22B 9/026; F27D 27/00
(Continued)

(56) References Cited

U.S. PATENT DOCUMENTS

| 7,647,828 | B2 * | 1/2010 | Gassert | .................. B29C 65/08 |
| | | | | 228/1.1 |
| 7,682,556 | B2 * | 3/2010 | Han | ........................ B22D 1/00 |
| | | | | 222/603 |
| 2007/0235159 | A1 | 10/2007 | Han et al. | |

FOREIGN PATENT DOCUMENTS

| CN | 102278105 A | 12/2011 |
| CN | 103056331 A | 4/2013 |
| JP | H0784626 | 9/1995 |

OTHER PUBLICATIONS

International Search Report and Written Opinion from parent application n. PCT/ES2015/000185 dated Apr. 18, 2016 and dated Apr. 19, 2016.

* cited by examiner

*Primary Examiner* — Scott R Kastler
*Assistant Examiner* — Michael Aboagye
(74) *Attorney, Agent, or Firm* — Silvia Salvadori

(57) ABSTRACT

The device comprises a sonotrode (102) which can produce an oscillatory movement by means of a transducer (101) in order to generate ultrasound oscillation waves in said light alloy melt, when said sonotrode (102) and said melt are in contact, so as to perform the degassing; and an electronic-mechanical component (104) embedded in part of the sonotrode (102) for detecting the state of the service life or an anomaly of the sonotrode (102). The electronic-mechanical component (104) includes means for sending at least one notification signal to an electronic remote control equipment (103), forming a system together with the device. The electronic control device (103) is configured for sending an
(Continued)

activation or deactivation signal for activation or deactivation of said transducer (101), taking into account said at least one notification signal.

4 Claims, 1 Drawing Sheet

(58) Field of Classification Search
USPC ........ 228/1.1, 110.1, 262, 103; 266/78, 215, 266/216, 217; 75/10.64, 708; 96/155, 96/175
See application file for complete search history.

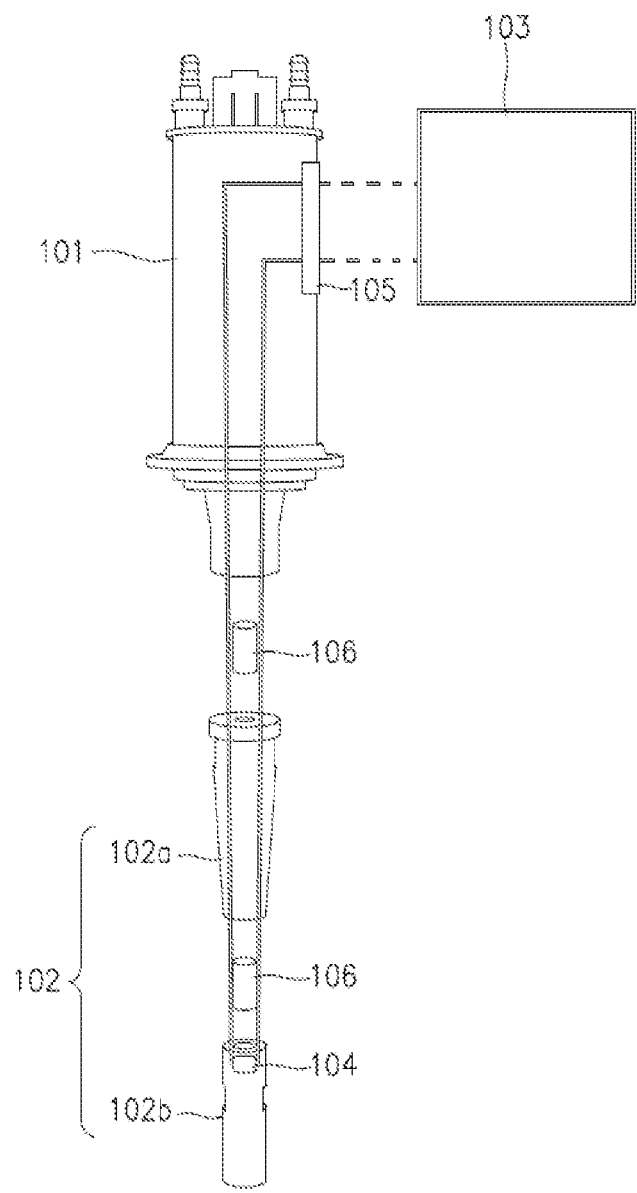

DEVICE FOR DEGASSING LIGHT ALLOY MELTS BY MEANS OF ULTRASOUNDS AND SYSTEM

RELATED APPLICATIONS

This application is the US national phase application of international application number PCT/ES2015/000185, filed 30 Dec. 2015, which designates the US and claims priority to Spanish Application U201500009 filed 30 Dec. 2014, the contents of each of which are hereby incorporated by reference as if set forth in their entireties.

TECHNICAL FIELD

The present invention generally relates to a device and system for degassing light alloy melts by means of ultrasounds. In particular, the present invention relates to a device for degassing light alloy melts by means of ultrasounds, and to a system including control means in the form of an electronic-mechanical component integrated in the device and suitable for recognizing, among other details, the characteristics, service life, and operating conditions of the device, and provided for sending a corresponding notification signal to electronic remote control equipment forming, together with the degassing device, the proposed system.

BACKGROUND OF THE INVENTION

Degassing light alloy melts, for example aluminum melts, is a very common activity in the casting industry. There are systems for degassing that are chemical in nature (by adding a product to the actual melt) or by means of gas bubbling. Systems based on gas bubbling include elongated ceramic elements with a porous end that are introduced into the molten metal. A very widely used variant comprises rotors, which use a rotating system which, combined with the gas injected into the metal, achieves a distribution of homogenously dispersed and very fine bubbles that entrain the impurities (primarily oxides) and gases (primarily hydrogen) present in the melt.

The device and system on which the present invention is based also operate by gas bubbling and use a source of ultrasounds in order to generate movement in the melt. The movement generated by the ultrasounds is cyclical, oscillatory and non-rotational.

Ultrasonic excitation occurs due to an oscillatory movement of a component or part, referred to as sonotrode, which amplifies the movement in the medium with which it is in contact and to which it transmits vibrations. The mentioned sonotrode, most often implemented in a cylindrical body, is responsible for transmitting the pressure waves to the fluid medium. The oscillatory movement is achieved as a result of a mechatronic system controlling the frequency and amplitude of the mentioned movement at all times.

In the case of the invention, the sonotrode is in contact with the melt, which is generally at a temperature of 800° C., and is manufactured with special materials suitable for withstanding said temperatures and, in turn, the high mechanical stress resulting from the operation thereof.

A device for degassing light alloy melts using ultrasounds is already known through patent document JP-B2-H0784626, "Method for adding ultrasonic oscillation into molten metal." However, the device proposed in the mentioned Japanese patent does not include control means capable of recognizing the components of the sonotrode, their working conditions and, in particular, how long the sonotrode was used, and reporting to remote control equipment.

Knowing the working hours of the sonotrode is of particular interest, since the service life of the sonotrode is generally limited, i.e., about 100 hours, depending on process conditions. After this time, the sonotrode is rendered less efficient since the oscillation frequency for which it was designed changes. The change in oscillation frequency occurs due to the accelerated erosion of the sonotrode in the region which is in contact with the melt, with the subsequent loss of mass. When said problem arises, the sonotrode or a part of same must be replaced with another sonotrode or new part, in order to perform a correct or optimal degassing.

BRIEF DESCRIPTION OF THE INVENTION

A first aspect of the proposed invention provides a device for degassing light alloy melts by means of ultrasounds, comprising, like degassing devices in the prior art, a sonotrode which can produce an oscillatory movement by means of a transducer for the purpose of generating vibrations resulting in waves at an ultrasound oscillation frequency in the light alloy melt, when said sonotrode and the melt are in contact, so as to perform the degassing.

The proposed degassing device characteristically includes control means in the form of an electronic-mechanical component, such as a programmable, chip-type integrated circuit with contact pins, preferably embedded in a fixed manner in a replaceable portion of the sonotrode, and which can be programmable to notify the electronic control equipment, which is generally located remotely with respect to the degassing device, of various operating conditions of the sonotrode, for example when the component parts are not suitable (because they do not belong to the same device or they are not officially approved), or not suitably coupled, or when the sonotrode experiences an anomaly or is close to fulfilling its service life, requiring replacement.

It has also been envisaged for the transducer to include in its shell an electronic unit or communication module to allow communication of the degassing device with the electronic remote control equipment.

In one embodiment, the mentioned electronic component includes detection means, for example an accelerometer (acting as a cycle counter), and recording means for detecting and recording the number of vibrations to which it has been subjected. This electronic component can also act as a detector for detecting vibration anomalies, such as out-of-frequency range vibrations, for example.

In one embodiment, the sonotrode is coupled to the transducer by means of mechanical attachments. In this case, the mentioned electronic-mechanical component is also prepared for recognizing when said coupling through said attachments is correct.

Likewise, the mentioned electronic-mechanical component can also be programmed for recognizing that the sonotrode and the transducer belong to one and the same degassing device.

In another embodiment, the mentioned electronic-mechanical component is embedded in an interchangeable tip of the sonotrode. The mentioned interchangeable tip is arranged at an end part of the sonotrode and is the element responsible for making contact with the light alloy melt. Furthermore, the interchangeable tip is attached to a main module of the sonotrode located between the transducer and the interchangeable tip and coupled to said main module through mechanical attachments.

Embodiments of the present invention also provide a system for degassing light alloys by means of ultrasounds formed by the degassing device, including the electronic-mechanical component, and the electronic control equipment.

BRIEF DESCRIPTION OF THE DRAWINGS

The preceding and other features and advantages will be better understood based on the following detailed description of the embodiments in reference to the attached drawings, in which:

FIG. 1 is a view of the device and system for degassing light alloy melts by means of ultrasounds proposed by the present invention according to embodiments.

DETAILED DESCRIPTION OF THE EMBODIMENTS

FIG. 1 shows an embodiment of the proposed degassing device and system. In this particular case, the degassing device 100 comprises a sonotrode 102 divided into two parts. The first part is formed by a rod or main module 102a, which is the element attached or coupled with, by means of screw-on type mechanical attachments 106, for example, the part of the vibration mechanism or transducer 101 and an interchangeable tip 102b of the sonotrode 102. The second part refers to the mentioned interchangeable tip 102b, which is located at the end of the sonotrode 102, wherein it is the part of said sonotrode 102 in direct contact with the melt.

The transducer 101 can communicate with or be connected to, preferably by means of wireless communication, by means of an electronic unit 105 (located in this embodiment in the shell around it), electronic control equipment 103, which is generally located remotely, such as a PC, a laptop computer, among other computing devices with at least one processor and at least one memory, so that this computing device sends an activation signal for activating the transducer 101 so that it initiates vibration of the degassing device 100 and degassing takes place since the sonotrode 102 and the melt are in contact. If there is no signal, if it is different or there is no continuity, the transducer 101 cannot initiate vibration.

For the purpose of knowing different operating conditions of the sonotrode 102, for example how much of its service life remains, in correct operating conditions, integral parts, or if it experiences any anomaly, the degassing device 100 includes an electronic-mechanical component 104, for example a chip-type integrated circuit, or programmable logic controller, preferably embedded in a fixed manner in a portion of the interchangeable tip 102b, or region of attachment with the main module 102a.

The mentioned electronic-mechanical component 104 is unique for each sonotrode 102 and is programmed with a proprietary system, its functions including acting as a proprietary identification method (proprietary ID). At source (by the manufacturer of the sonotrode 102) the electronic-mechanical component 104 is internally encoded with parameters that uniquely and individually identify the element in which it is incorporated (in this case the sonotrode 102), for example: user, material, manufacturing dates, serial number, etc. Said electronic-mechanical component 104 also has incorporated therein relevant information about the service life, i.e., the number of maximum allowable vibrations as a result of the electronic-mechanical component 104 itself incorporating detection means (for example an accelerometer) and recording means for detecting and recording the acceleration of the tip of the sonotrode 102. The electronic-mechanical component 104 also has sufficient capacity to store a larger number of variables and parameters, encoded at the basic programming or firmware level.

The electronic-mechanical component 104 also acts like a bridge of an ON/OFF circuit of the degassing device 100, i.e., it recognizes whether or not the sonotrode 102 is assembled in the vibration system, and it is responsible for providing the order to the excitation system or transducer 101.

The mentioned electronic-mechanical component 104 is also programmed for sending all the detected information, embedded in at least one notification signal, to the electronic control equipment 103, where the equipment is capable of analyzing said vibrations by verifying that they are within a specific amplitude range and of predicting potential fractures, end of the estimated life of the sonotrode 102, for example 100 operating hours, or even predicting and proposing the replacement of the sonotrode 102.

The electronic control equipment 103 comprises, in a comprehensive and open manner, all the relevant information of the degassing device 100. By means of implementing computer software, the electronic control equipment 103 is capable of managing all the received data, relating pieces of said data to one another, and proposing actions in relation thereto, such that the electronic control equipment 103 can control and paralyze the degassing device 100 in the event that serious problems are detected, or can emit an alarm or warning signal. The electronic control equipment 103 also has display means, such as a screen (s), which can be customized by each user, on which the relevant data of the degassing process, including service life of the sonotrode 102, numbers of operating hours, etc., can be shown. The electronic control equipment 103 can be connected to a communications network, such as the Internet, and can act like an hourly use license system in the case of leasing out molding operations. The electronic control equipment 103 can also be controlled remotely using network communications.

In one embodiment, the electronic-mechanical component 104 can recognize each of the elements forming the degassing device 100 and thereby validate that they belong to one and the same manufacturer or are officially approved components and enhance operation of the degassing device 100 as it prevents possible manufacturing incompatibilities between different elements. The electronic-mechanical component 104 could even block the device (through an order received from the mentioned electronic control equipment 103) for said device to stop working if it recognizes that the elements forming it belong to different manufacturers.

In another embodiment, the electronic-mechanical component 104 can also detect that the degassing device 100 is correctly coupled/closed (i.e., the attachments 106 correctly couple the sonotrode 102 with the transducer 101 and to parts 102a and 102b), and therefore the degassing device 100 can work as usual.

In another embodiment, not illustrated in this case, the degassing device is formed by a single sonotrode body. In this case, the electronic-mechanical component 104 is preferably embedded in the part for attaching the sonotrode 102 with the transducer 101.

A person skilled in the art could introduce changes and modifications in the embodiments described above without departing from the scope of the invention as defined in the enclosed claims.

The invention claimed is:

1. A system for degassing light alloy melts by means of ultrasounds, comprising:

a degassing device (100) integrating:

a sonotrode (102) which can produce an oscillatory movement using a transducer (101) in order to generate waves at an ultrasound oscillation frequency in said light alloy melt, when said sonotrode (102) and said melt are in contact, so as to perform the degassing; and an electronic-mechanical component (104) embedded in an interchangeable tip (102b) of the sonotrode (102) provided at an end part of the sonotrode (102) and responsible for making contact with the light alloy melt, said electronic-mechanical component (104) comprising a programmable chip integrated circuit encoded with identification and service life parameters of the sonotrode (102) including user, material, manufacturing dates, serial number and information about a maximum allowable vibrations, said chip integrated circuit being programmed and configured to detect a state of a service life or an anomalous operation of the sonotrode (102) including vibration anomalies, said electronic-mechanical component (104) being configured to send the detected state or detected anomalous operation, conveyed in at least one notification signal; and an electronic control equipment (103), located remotely with respect to the sonotrode (102), configured to receive said at least one notification signal and to establish a connection using an electronic unit (105) with said transducer (101) for activation or deactivation of the transducer (101), depending on said at least one notification signal.

2. The system according to claim 1, wherein said chip integrated circuit further comprises detection means, including an accelerometer, and a recording unit to detect and record a number of vibrations to which it has been subjected.

3. The system according to claim 1, wherein said interchangeable tip (102b) is attached to a main module (102a) of the sonotrode (102) arranged between the transducer (101) and the interchangeable tip (102b) and coupled to said main module (102a) using a mechanical attachment (106), and wherein the electronic-mechanical component (104) is configured for further detecting a correct coupling of the sonotrode (102) using said mechanical attachment (106).

4. The system according to claim 1, wherein said electronic unit (105) is arranged in a shell around the transducer (101).

* * * * *